(12) United States Patent
Freund et al.

(10) Patent No.: US 12,556,570 B2
(45) Date of Patent: Feb. 17, 2026

(54) AUTOMATED RECOMMENDATION OF MOST VALUABLE SOLUTION TO NON-COMPLIANT CYBERSECURITY NETWORK PATTERNS

(71) Applicant: Dell Products L.P., Round Rock, TX (US)

(72) Inventors: Werner Spolidoro Freund, Rio de Janeiro (BR); Roberto Nery Stelling Neto, Rio de Janeiro RJ (BR); Vitor Nascimento Lourenço, Niterói-RJ (BR); Amy N. Seibel, Newton, MA (US); Sarah Evans, Parker, CO (US); Eric Frank Cotter, The Woodlands, TX (US); Andrew Veitch, Weston, MA (US); Kenneth Durazzo, Morgan Hill, CA (US)

(73) Assignee: Dell Products L.P., Round Rock, TX (US)

( * ) Notice: Subject to any disclaimer, the term of this patent is extended or adjusted under 35 U.S.C. 154(b) by 149 days.

(21) Appl. No.: 18/423,818

(22) Filed: Jan. 26, 2024

(65) Prior Publication Data

US 2025/0247412 A1 Jul. 31, 2025

(51) Int. Cl.
*H04L 29/00* (2006.01)
*H04L 9/40* (2022.01)

(52) U.S. Cl.
CPC ............................. *H04L 63/1433* (2013.01)

(58) Field of Classification Search
CPC .................................................. H04L 63/1433
See application file for complete search history.

(56) References Cited

U.S. PATENT DOCUMENTS

| 8,495,744 | B2* | 7/2013 | El Khoury | H04L 63/1433 726/25 |
| 11,770,398 | B1* | 9/2023 | Erlingsson | G06F 16/3329 709/224 |
| 12,095,796 | B1* | 9/2024 | Godefroid | G06F 9/542 |
| 12,267,345 | B1* | 4/2025 | Erlingsson | G06F 9/5072 |
| 2009/0030756 | A1* | 1/2009 | Riley | G06Q 10/063 705/7.11 |

(Continued)

OTHER PUBLICATIONS

Executive Memo M-22-09. Moving the US Government Toward Zero Trust Cybersecurity Principles. Executive Office of The President Office of Management and Budget. Memorandum for the Heads of Executive Departments and Agencies. Jan. 26, 2022.

(Continued)

*Primary Examiner* — Don G Zhao
(74) *Attorney, Agent, or Firm* — Workman Nydegger

(57) ABSTRACT

One example method includes receiving a set of requirements for aspects of a network, identifying a gap between one of the aspects of the network and a zero trust (ZT) requirement, determining a solution set comprising potential solutions for reducing or eliminating the gap, associating a respective cost with each of the solutions, determining an extent to which the solutions of the solution set comply with requirements, recommending a best solution from the solutions of the solution set, determining a priority of the gap relative to respective priorities of other gaps, and outputting a list of the gaps, sorted by priority, and the recommended best solution.

18 Claims, 3 Drawing Sheets

(56) References Cited

U.S. PATENT DOCUMENTS

| | | | | |
|---|---|---|---|---|
| 2012/0185944 | A1* | 7/2012 | Abdine | G06F 21/577 |
| | | | | 726/25 |
| 2018/0176254 | A1* | 6/2018 | Lam | H04L 63/105 |
| 2021/0409437 | A1* | 12/2021 | Roach | H04L 63/1433 |
| 2022/0292199 | A1* | 9/2022 | Mosko | H04L 63/1433 |
| 2023/0185925 | A1* | 6/2023 | Nhlabatsi | G06F 21/53 |
| | | | | 726/25 |
| 2023/0229787 | A1* | 7/2023 | Mahdavipour | H04L 63/1433 |
| | | | | 726/25 |
| 2023/0388278 | A1* | 11/2023 | Crabtree | H04L 63/0428 |
| 2023/0421593 | A1* | 12/2023 | Crabtree | H04L 63/1425 |
| 2024/0039954 | A1* | 2/2024 | Shete | H04L 63/1425 |
| 2024/0163312 | A1* | 5/2024 | Azad | H04L 63/20 |
| 2024/0275807 | A1* | 8/2024 | Lima | H04L 63/20 |
| 2024/0291846 | A1* | 8/2024 | Saraf | H04L 63/0876 |
| 2024/0356983 | A1* | 10/2024 | Akali | H04L 63/0236 |
| 2024/0422187 | A1* | 12/2024 | Shah | H04L 63/1408 |
| 2025/0016190 | A1* | 1/2025 | Rawat | H04L 41/22 |
| 2025/0030722 | A1* | 1/2025 | Ragula | H04L 63/102 |
| 2025/0055869 | A1* | 2/2025 | Barel | H04L 63/1433 |
| 2025/0063063 | A1* | 2/2025 | Tishbi | G06F 16/9024 |
| 2025/0133120 | A1* | 4/2025 | Valek | H04L 63/1433 |
| 2025/0159024 | A1* | 5/2025 | Assayag | H04L 63/0236 |

OTHER PUBLICATIONS

Executive Order on Improving the Nation's Cybersecurity. The White House. May 12, 2021.

DoD Reference architectures v2 (170 pages). Department of Defense (DOD) Zero Trust Reference Architecture Version 1.0. Feb. 2021. Prepared by the Joint Defense Information Systems Agency (DISA) and National Security Agency (NSA) Zero Trust Engineering Team.

Rose, et al. National Institute of Science and Technology (NIST) 800-207 Zero Trust Architecture. U.S. Department of Commerce. Aug. 2020. https://doi.org/10.6028/NIST.SP.800-207.

National Cybersecurity Center of Excellence (NCCoE) NIST Special Publication 1800-35 Implementing a Zero Trust Architecture, vol. A Executive Summary (2nd preliminary draft), vol. B Approach, Architecture, and Security Characteristics (2nd Preliminary Draft), vol. C How-To Guides (2nd Preliminary Draft), vol. D Functional Demonstrations (2nd Preliminary Draft), vol. E Risk and Compliance Management (Preliminary Draft). Sep. 2023. https://www.nccoe.nist.gov/projects/implementing-zero-trust-architecture.

CISA. Zero Trust Maturity Model v 2. Apr. 2023. Cybersecurity and Infrastructure Security Agency Cybersecurity Division. https://www.cisa.gov/sites/default/files/2023-04/zero_trust_maturity_model_v2_508.pdf.

DoD Zero Trust Capability Execution Roadmap. Jan. 6, 2023. DoD CIO—Department of Defense. https://dodcio.defense.gov/Portals/0/Documents/Library/ZT-ExecutionRoadmap-v1.1.pdf.

Chandramouli, et al. National Institute of Standards and Technology U.S. Department of Commerce. A Zero Trust Architecture Model for Access Control in Cloud-Native Applications in Multi-Location Environments. 2023. NIST Special Publication 800-207A (NIST SP 800-207A). https://nvlpubs.nist.gov/nistpubs/SpecialPublications/NIST.SP.800-207A.ipd.pdf . https://csrc.nist.gov/pubs/sp/800/207/a/final.

Popa, et al. Ericsson. Ericsson Blog. 3 ways to train a secure machine learning model. Feb. 5, 2020. https://www.ericsson.com/en/blog/2020/2/training-a-machine-learning-model.

* cited by examiner

AUTOMATED RECOMMENDATION OF MOST VALUABLE SOLUTION TO NON-COMPLIANT CYBERSECURITY NETWORK PATTERNS

FIELD OF THE INVENTION

Embodiments of the present invention generally relate to the implementation of zero trust architectures (ZTA). More particularly, at least some embodiments of the invention relate to systems, hardware, software, computer-readable media, and methods, for implementing, possibly automatically, changes to a user system architecture to bring the architecture into conformance with a desired zero trust configuration.

BACKGROUND

With the increased emphasis on zero trust in computing systems, users and owners are looking to update their architectures to bring them into conformance with ZT (zero trust) principles. However, there is no system capable of automatically suggesting an optimal migration path between the current capability stack of an organization and an ideal ZT state.

Further, each individual enterprise implementing zero trust security architectures must manually consider and stitch together a variety of considerations in an effort to define, and implement, a migration path from the current state of the architecture to a desired ZT state for that architecture. These considerations, which vary from one organization to another may include organizational requirements, available budget for the migration, and prior investments in particular vendor solutions for ZT.

Further, security requirements must be incorporated to meet ZT architectures, irrespective of budget or vendor lock-in. Finally, because of the manual nature of the migration process today, there is no way for an organization to benefit from lessons learned by other organizations in their migration efforts.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
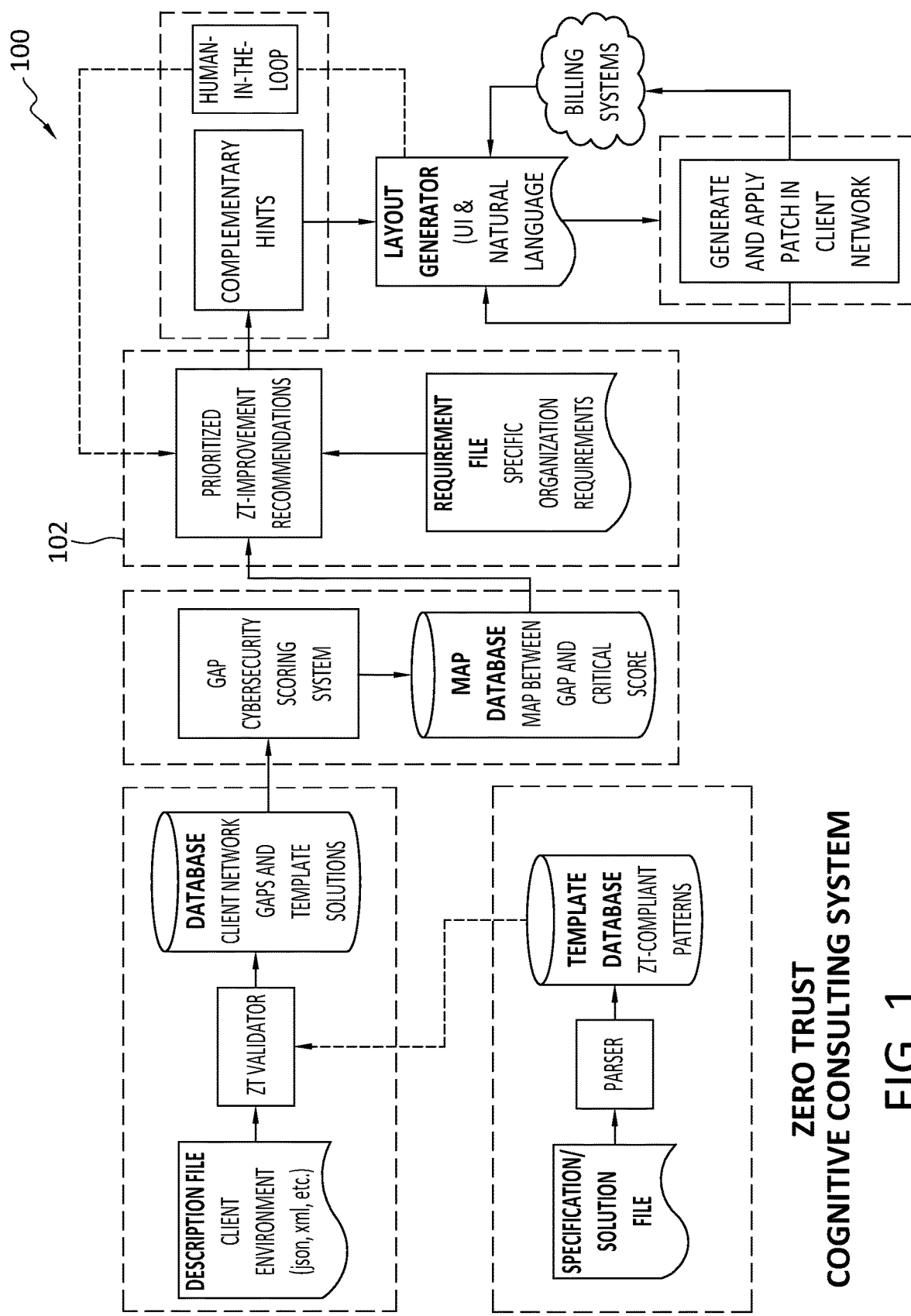
FIG. 1 discloses aspects of an environment in which an embodiment may be implemented.

Embodiments of the present invention generally relate to the implementation of zero trust architectures (ZTA). More particularly, at least some embodiments of the invention relate to systems, hardware, software, computer-readable media, and methods, for implementing, possibly automatically, changes to a user system architecture to bring the architecture into conformance with a desired zero trust configuration.

One example embodiment is directed to a method for automatically updating an architecture to bring the architecture into compliance with identified ZT standards. In an embodiment, this method may comprise the following operations: associating a solution set, that is, a group of possible ZT migration solutions, with a cost of implementation; determining whether the solution set complies with an applicable ZT specification; selecting, as among a group of solution sets, a solution set that most closely conforms with the ZT specification; and, determining, with reference to the selected solution set, which solution in that solution set will be implemented, and the determination is based in part on respective cost and criticality of each of the solutions.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that an architecture may be automatically brought into compliance with an applicable ZT standard. An embodiment may generate, possibly automatically, a migration plan that may enable a user to bring an architecture into compliance with an applicable ZT standard. An embodiment may prioritize, according to various criteria, recommendations for changes to an architecture. An embodiment may identify gaps between a current architecture and a desired ZT configuration. Various other advantages of one or more example embodiments will be apparent from this disclosure.

A. Context for an Example Embodiment

Present approaches to updating an architecture for ZT compliance are problematic, at least insofar as they constitute manual processes prone to human, and other, error. Further, there is no 'lessons learned' mechanism to enable one user to benefit from the experience of another user in modifying its architecture.

Further, while recommendation systems exist in other contexts, such as retail suggestions for e-commerce—"here are other suggested items you might like"—those systems fail to take into account all of the variables and complexities described in this disclosure, or the unique needs of zero trust implementations. For example, while Amazon may suggest other books you might like based off of your previous interest in mountain climbing, there is nowhere a user can go that tells the user how, given its specific set of IT constraints, budget constraints, and others, the user may prefer Identity Provider X over Identity provider Y.

At present, understanding the current state capabilities of an organization capabilities is a manual process. For example, information is stored in silos across an organization, data formats are not universal—such as visual architectures, transcripts of recorded conversations with individuals, written documents, and tribal knowledge—and users are frequently limited to tools a specific vendor offers within their specialty, network based for example, vs. holistic across an environment.

Further, DoD and NIST reference architectures are frequently updated and replaced; enterprise business requirements or current capability stack may evolve as well. Thus, there is no always up-to-date view of combined reference architectures to compare an organization environment to, such as static snapshots of separate documents. Further, a human expert must manually read documents—this is not a scalable process, and is repeated at every organization going through a ZT transformation.

As well, manual ZT gap analysis consulting is time consuming, prone to human error, and not scalable. Even within the industry at large, automated gap analysis is not uniformly available.

B. Overview of Aspects of an Example Embodiment

B.1 Introduction

Given considerations and constraints such as those noted in the preceding section, an example embodiment may deal with those, at least in part, by identifying a best set of solutions for gaps in compliance with organization ZT requirements. In more detail, an embodiment may comprise a system, and method, for supporting an organization during its process of migrating a network to be Zero Trust (ZT) compliant. In this way, an embodiment may enable this system to select the best solution for each gap. One embodiment may consider problems such as:

for each gap, generating optimal conditional system responses based on the organization requirements and specificities—these may include:
organization high-level goals—for example, maximize security for a given budget or focus on most critical security aspects regardless of the budget;
specific go/no-go or prioritizations of hardware/software solutions;
budget limits for each type or category of hardware and/or software etc.; and
provided all gaps, generating prioritizable responses according to organization criterion.

B.2 Considerations for an Embodiment

Development and/or implementation of an embodiment may comprise a variety of processes and operations. Examples of these are set forth below.

1. Document the current capability stack, which included scheduling individual fact-finding meetings to tease out tribal knowledge and roadmaps with multiple IT, Security, BU (business unit) lab management stakeholders to explore:
identity provider;
network architectures (ingress and egress);
servers;
applications;
data flows;
data classification;
logging and monitoring;
how much storage was in place for workloads and logging/monitoring;
perform a baseline penetration test; and
document a user experience journey—for example, which user personas would be logging in, from where, what data would they be processing and what tools would they use. Document their baseline user experience to ensure the new architecture met minimum user requirements and did not deprecate the current experience.

2. Define the ideal state, which may include reading, digesting and mentally consolidating information from the following Zero Trust Security Architecture federal documents:
Executive Memo M-22-09 Moving the US Government Toward Zero Trust Cybersecurity Principles
Executive Order on Improving the Nation's Cybersecurity
DoD Reference architectures v1 (later replaced by v2)
National Institute of Science and Technology (NIST) 800-207 Zero Trust Architecture
National Cybersecurity Center of Excellence (NCCoE) NIST Special Publication 1800-35 Implementing a Zero Trust Architecture
Volume A Executive Summary ($2^{nd}$ preliminary draft)
Volume B Approach, Architecture, and Security Characteristics (2nd Preliminary Draft) (185 pages)
Volume C How-To Guides (2nd Preliminary Draft)
Volume D Functional Demonstrations (2nd Preliminary Draft)
Volume E Risk and Compliance Management (Preliminary Draft)
CISA Zero Trust Maturity Model v 2
DoD Zero Trust Capability Execution Roadmap 3. Identify a unique reference architecture that brings the current capability stack into compliance with ideal state Zero Trust Security tenets:
meet the requirements listed in the reference architecture documentation;
address the user needs;
leverage existing vendor investments and technology capabilities;
add new vendor investments and technology capabilities that matches IT and security roadmaps;
build a foundation that enables iterative maturity and growth over time minimizing rework;
develop a budget for what was required to close the gaps between current and ideal state;
could be completed within requested timelines; and
could be completed with existing company resources.

B.3 Environment

With reference briefly now to FIG. 1, an example consulting system environment 100, in which an embodiment may be implemented, is disclosed. In an embodiment, some or all of the functionalities disclosed in FIG. 1 may be provided as-a-Service (aaS), by a service provider, to one or more clients or customers, such as entities who need to bring their architectures into compliance with ZT principles and standards. This concept may be referred to herein at ZTaaS (Zero Trust as a service).

In general, one embodiment of the invention is directed to the functional block 102 concerned with, among other things, the automated recommendation of a most valuable solution to non-compliant cybersecurity network patterns. In that regard, a ZT approach to security may involve both protecting the present attack surface, and in parallel, planning to evolve towards a zero trust method to protect the attack surface of tomorrow. The adoption of ZT may thus require either complex restructuring of current cybernetworks, in what may be referred to as a 'brownfield' approach, or starting a new cybernetwork from scratch, in what may be referred to as a 'greenfield' approach.

Since many organizations will not be able to implement a greenfield approach, one embodiment may be directed to addressing brownfield migration challenges, examples of which are set forth hereafter. For example, some challenges for brownfield migrations may include: [1] a need for full environment discovery; [2] difficulty in addressing complicated dependencies and interactions between various ZT architecture components/requirements; [3] differences between organizational architectures, all of which may need ZT solutions; [4] evolving baseline zero trust requirements; and, [5] difficulty in scaling the gap analysis process, and the process of closing those gaps.

An embodiment may thus comprise a system configured and operable to support organizations in migrating their current-state networks to become compliant with zero trust reference architectures. In an embodiment, a system may support current-state environment discovery, implementation recommendations and planning, execution, and optimization.

C. Detailed Discussion of Aspects of an Example Embodiment

One example embodiment may comprise various components. One of such components is an automated recommendation tool that the specific gaps in the ZT implementation of an organization, accounting for the organization budget, prior investments in particular vendor solutions, and security aspects that may be included in a ZT solution, regardless of vendor lock-in, budget constraints, or user requirements. Another of such components is the ability to optionally participate in, and benefit from, secure collaborative learning such as by using lessons learned information from other organizations. An embodiment may thus comprise a system capable of providing optimal solution and response prioritization of network gaps conditioned on their criticality score and the organization requirements.

Figure 2:
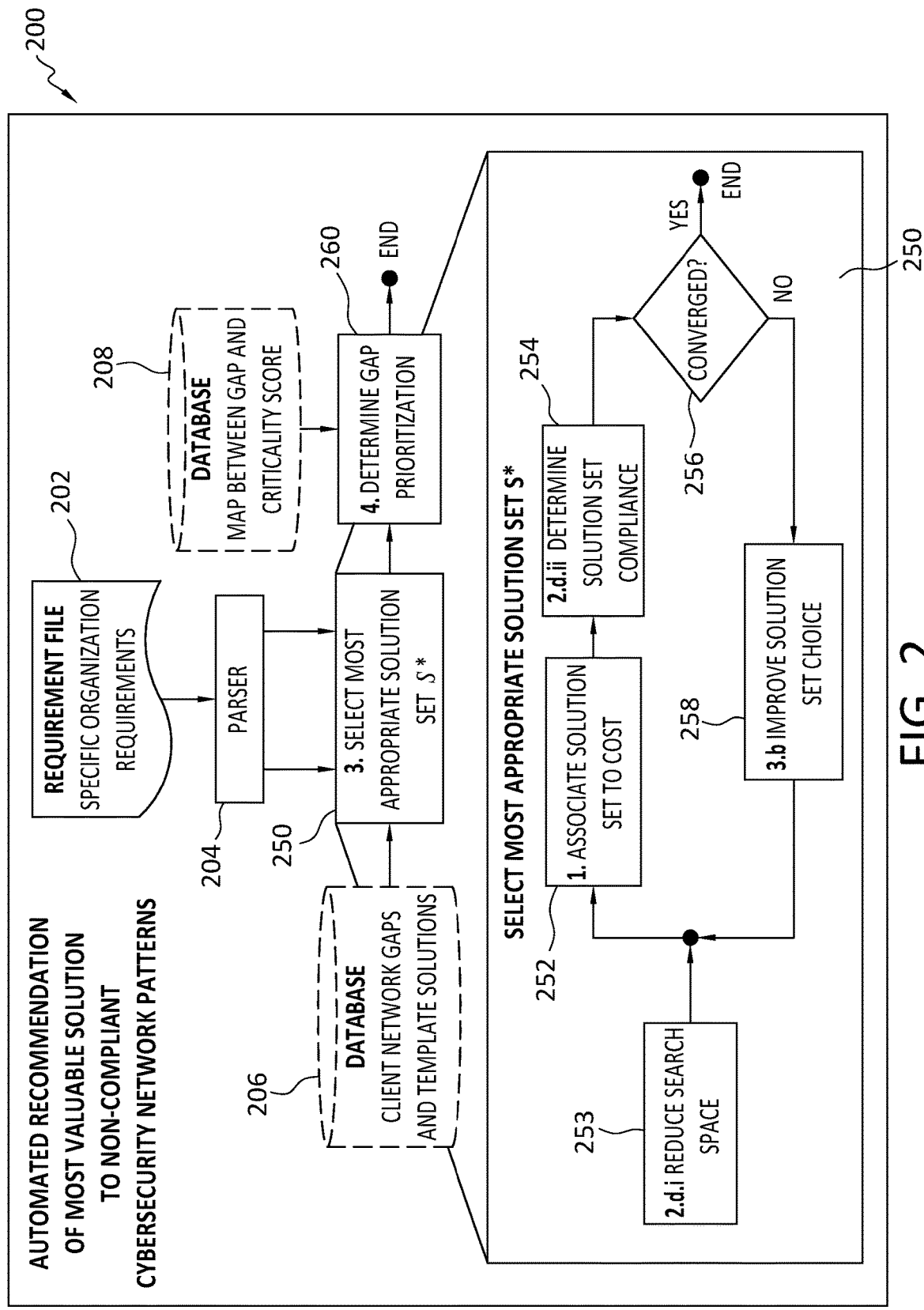
FIG. 2 discloses aspects of an architecture and associated method according to an embodiment.

Turning now to FIG. 2, an example architecture 200 and associated method 250 according to one embodiment are disclosed. An embodiment may assume the requirements to have structured information, such as a requirements file 202 with organization-specific requirements, that can be parsed, such as by a parser 204, using technologies currently available.

Using this structured information, along with inputs such as, but not limited to, client network gaps and templates solutions, such as may be stored in a database 206, an embodiment may operate to select 250 a most appropriate solution set for that organization that will transform the architecture of that organization to a ZT compliant architecture.

In more detail, let G and S respectively represent [1] the set of organization gaps and [2] the complete solution space, that is, with multiple solution templates for a corresponding gap that may have been obtained from a gap analysis procedure. The system according to one embodiment may then perform the following computations.

C.1 Associating a Solution Set to a Cost

In particular, the method 250 may begin with association 252 of a solution set to a cost to implement that solution set. The association 252 of a solution set to a cost may proceed as follows:

a. The organization may specify several conditional cost rules. Let $\mathcal{C} = \{c_1, \ldots, c_n\}$ represent the conditional cost rules.

b. Let $S \in \mathcal{S}$ denote a solution set, with each solution $s_i \in S$ corresponding to a gap $g_i \in \mathcal{G}$.

c. Let $t = M(S; \mathcal{C})$ be a function mapping a solution set $S$ to a total cost t as parametrized by the cost rules $\mathcal{C}$. Then function M operates in the following way:

i. It evaluates rule set $\mathcal{C}$ by traversing each rule in the solution set $S$. The sequential application of rules is used to avoid association of graph primitives in the solution set s to multiple cost types. One potential embodiment is to use a property flag whether a primitive is already associated to a cost and do not allow the evaluation mechanism to match whenever there are previously flagged primitives.

ii. Let $\mathcal{M}_i$ respectively be the set of solution motifs (subgraphs) matching a rule $c_i \in \mathcal{C}$ as determined by an evaluation mechanism. Potential embodiments for such evaluation mechanism are prolog expressions, GraphQL queries in case of graph databases, and SPARQL or Gremlin in case of triple stores. We note that these rules can be specified in any description language that is friendly to the organization and then converted to the reasoning framework embodiment through custom conversion libraries, however the specific details are out-of-the-scope of this invention.

iii. Let $\mathcal{G}_i$ be the gaps corresponding to each solution motif in $\mathcal{M}_i$, i.e., $g_j \in \mathcal{G}_i$ is the gap for $m_j \in \mathcal{M}_i$.

iv. Let cost value $v_i = V_i(\mathcal{M}_i, \mathcal{G}_i)$ represent the associated cost for each match of rule $c_i \in \mathcal{C}$ as specified the requirements file. The function $V_i$ allows to conditionally determine the cost considering the specificities of the matches in the solution set. For instance, it could be used to implement variable prices as a function of the total times it matched to a particular primitive, or to determine that a primitive combined to other set of primitives results in different costs to the organization depending on the negotiations it performs with the vendors.

The cost may be multidimensional with potential additional dimensions used to represent other relevant impacts in the network end goals or user experience, e.g., latency, power consumption, etc. For example, if low latency is a top user requirement and a solution is likely to result in high latency relative to other options, an additional "cost" may be associated with that solution. The result would be to lower the prioritization of the recommendation, and therefore the likelihood that the recommendation would be selected. This could be made transparent to the user, for example through a sorting or filtering capability that showed only monetary costs vs. noncompliance "costs" for optional requirements.

Some cost dimensions may depend on information available on information from both $m_j \in \mathcal{M}_i$ and $g_j \in \mathcal{G}_i$, e.g. the total latency may depend on properties of the cable between two endpoints and the underlying processing security algorithms, which is captured by the general embodiment $V_i($ $\mathcal{M}_i$, $\mathcal{G}_i$). Whenever possible, to simplify the complexity of the computations and the details when specifying $V_i$, it is preferred to specify forms of type $V_i(\mathcal{M}_i)$.

v. The total cost value v for the solution set $\mathcal{S}$ is $v=\Sigma_i v_i$. An aggregation function $\alpha(\bullet)$ is employed in case v is multidimensional. Then the result of $M(\mathcal{S};\mathcal{C})$ is simply $t=\alpha(v)$. One potential embodiment for the aggregation function is simply to apply a weight w to determine the importance of each cost dimension, i.e., $\alpha(v)=w^T v$.

C.2 Determining Solution Set Compliance with the ZT and Other Specifications

After the solution set has been associated 252 with a cost, and as a possible prerequisite to performing a determination 254 as to the compliance of the solution set with the applicable ZT specifications, the method 250 may first perform a search space reduction 253. In an embodiment, the operations 253 and 254 may proceed as follows:

2. Determining solution set compliance with ZT specifications (see FIG. 2 at 254, 2.d.ii)
  a. The organization may specify a set of conditions and compliance rules that are specified by the organization in the requirement file 202.
  b. Let $\mathcal{R}$ represent these conditions and compliance rules. The same evaluation mechanism embodiment employed for the cost rules can be used to determine whether a rule $r_i \in \mathcal{R}$ matches.
  c. Let $$e = E(\mathcal{R}; S, \mathcal{G}, v) = \prod_{r_i \in \mathcal{R}} r_i(S, \mathcal{G}, v)$$

represent the chain evaluation of the rules R in the solution set $\mathcal{S}$ for a gap set $\mathcal{G}$ with associated cost v. Then, an embodiment may determine if the solution set $\mathcal{S}$ is compliant by ensuring that $E(\mathcal{R})=1$.
  d. It is noted that it is possible to apply a decomposition into disjoint sets $\mathcal{R} = \mathcal{R}_s \cup \mathcal{R}_v$ where:
    i. Reduce search space (see FIG. 2 at 253, 2.d.i): $\mathcal{R}_s$ is the subset of rules that can be computed independently for each solution in the solution set. Since they are independent, this set of rules can be applied beforehand to the full search in the solution space to reduce its complexity. Let $r_i$: $S \times G \rightarrow \{0,1\}$, then $$\tilde{S} = \bigcup_{s_j \in S} I(s_j, g_j)$$

where $I(s_j)$ is a piecewise function mapping to $s_j$ if $E(\mathcal{R}_s)=1$ (i.e., all the $\mathcal{R}_s$ rules pass for the solution $s_j$) and $\emptyset$ otherwise. Examples of potential requirements of this type are:
      specifying a subset of software and hardware solutions to work with (i.e., ruling out some vendors);
      determining a set of software solution is preferred with some specific hardware solution, or any other compound structure that does not require evaluating specificities of other solutions in the solution set; and
      specific properties in a particular part of the network, e.g., computational requirements, bandwidth limitations, security maturity level for a particular node. It can be achieved with $r_i$ embodiments taking advantage of the transformation $V_i$.
    ii. Determine solution set compliance (see FIG. 2 at 254, 2.d.ii): $\mathcal{R}_v$ is the subset of rules applied directly to the total cost value v, i.e., $r_i$: $V \times G \rightarrow \{0, 1\}$. Although the mapping function $r_i \in \mathcal{R}_v$ is simple and generally only used to determine an upper limit, these constraint rules can cover several useful use cases by making extensive use of the functions $V_i$ to determine joint limits to the solution set. For instance, these rules can be used to provide upper bounds in the total computational requirements, cost, or number of licenses/units of a particular software/hardware and/or vendor. Many other more complex rules can be specified. It is noted that an embodiment may enable a set of dimensions of the total cost value v to be used only to determine constraints in the solution space by setting the corresponding $w_i=0$.

C.3 Selection of the Most Appropriate Solution Set

Next, the most appropriate solution set $\mathcal{S}^*$ may be selected (see FIG. 2 at 250). In this regard:
  a. the problem may then be described as the combinatory optimization problem:

$$\mathcal{S}^* = \underset{\hat{S} \in \tilde{S}}{\arg\min}\, M(\hat{S}; C)$$

subject to $E(\mathcal{R}_v; \hat{S}, \mathcal{G}, v)$ where $\tilde{S}$ is the reduced search space after applying the $\mathcal{R}_s$ rule set.

If the solution set has not converged 256, the solution set choice may be improved 258 (see FIG. 2 at 258, 3*b*). In an embodiment, the solution set choice improvement 258 may proceed as follows:
  b. Improve the solution set choice: User feedback may be used to improve the efficiency of the space exploration—it is noted that this can be done in variety of ways, via several algorithms that are available in the literature for those skilled in the art—in an embodiment, the algorithm selection may depend on the specific embodiments of M and E parametrizations.
    i. One embodiment may comprise the ability to benefit from user feedback to improve $\hat{S}$ space exploration strategy.
    ii. In these cases, there may be an assumption that users would have granted consent to incorporate model learnings into a shared model with other organizations—for example, in exchange for being able to benefit from the experiences of other organizations in implementing ZT compliant architectures.
    iii. To protect the underlying data, secure approaches to collaborative machine learning (ML), such as federated learning, federation with secure aggregation, and the so-called 'coopetitive' learning and/or a platform such as $MC^2$, which enables secure analytics and machine learning on encrypted data, may be used.

iv. Let $S^{(u)}$ denote the user selected solutions with corresponding model output $S^*$. Several feedbacks of such type can be integrated using above methods to determine better model parametrizations by updating it to select $S^{(u)}$ instead of $S^*$ and, hence, improve space exploration strategy to output user preferred solutions.

c. Finally, heuristics may be applied to simplify the search space. For instance, some organizations may only specify $\mathcal{R}_s$ rules and use a cost rule set $\mathcal{C}$ that do not rely on $V_i$ specifications, enabling reduction of the problem to one of non-combinatorial optimization, that is, choosing the best solution for each gap individually. An embodiment may also reduce the search space by determining a small group of initial preferred solution types and then grow the possibilities.

C.4 Selection of the Most Appropriate Solution Set

Finally, an embodiment may determine gap prioritization, that is, as among the gaps between the current architecture of the customer, and the desired ZT configuration of that architecture, determining which of those gaps is the highest priority to close, or at least reduce. Inputs used to inform a gap prioritization process 260 may include a map or other data structure, possibly stored in a database 208, that captures a relation between a gap and an associated criticality score. For example, if a gap is critical for closure or reduction, the criticality score for that gap may be relatively higher than a criticality score for a gap that is less critical for closure or reduction. In one embodiment, a gap prioritization determination may proceed as follows:

a. A system according to one embodiment may represent each gap $g_i \in \mathcal{G}$ in a two-dimensional plane: (1) the solution cost $\alpha(v_i)$ versus (2) the gap cybersecurity criticality score Zi. The organization may determine several ways to prioritize the solutions in this plane. Examples of potential prioritization rules include, but are not limited to:

Sort solutions by increasing cost;

Sort solutions by decreasing criticality score;

Divide the two-dimensional plane into 9 quadrants using quantiles and focus first on those within the lowest cost and highest criticality score and continue with some logic to other quadrants as specified by the organization principles—prioritization on a quadrant may follow the aforementioned rules;

A particular rule considering primitives in the gaps, therefore enabling the prioritization of particular aspects of the network; and The organization may be provided each $v_i$ component (or a composition, e.g. financial versus user experience costs), for instance when hovering the mouse over the gap $g_i$ in the plane, whenever such information is deemed useful to support decision making.

In an embodiment, the sorted list of gaps $\mathcal{G}^*$ according to the prioritization rule of choice, and the corresponding optimal solution set $S^*$, may be the main system outputs, but any other intermediary computation may also be provided to further downstream processing.

D. Further Discussion

One or more embodiments may possess various useful features and aspects, although no embodiment is required to possess any of these. Following are some examples.

An embodiment may provide automatic recommendations for network hardware and/or software changes based on a gap analysis and the respective criticality scores of the gaps. The recommendations may be prioritized according to the organization criteria which consider both the cost using customer requirements point of view and cybersecurity criticality score. The recommendations may collectively define a holistic view of the network, and identify where changes are needed.

Recommendations generated by an embodiment may consider optimal solutions for each gap based on the organization specifications, which may comprise a broad set of cost and constraint rules. An embodiment may enable an organization to add, remove, or adjust the functional form $(V_i)$ for each component based on factors such as current and desired maturity level, and/or other considerations notes herein, such as cost, and latency, for example.

As a final example, an organization may opt into participating in secure collaborative learning. In this way, the organization may be able to receive enhanced recommendations, generated by an embodiment based on lessons learned from feedback obtained from participating organizations.

E. Example Use Case

An organization gap analysis and requirements may be shared with the recommendation system according to an embodiment, and the recommendations may be prioritized according to the criteria of the organization, such as business requirements, and security requirements for example, and according to gap priority weightings. In an embodiment, a system may produce customized recommendations for the organization. In this case, the organization has opted into a secure collective learning platform, so the organization may benefit from lessons learned derived from the experience of one or more other organizations. In this example, the user may accept the recommendation, and a secure collective learning platform model may be updated.

F. Example Methods

It is noted with respect to the disclosed methods, including the example method of FIG. 2, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

G. Further Example Embodiments

Following are some further example embodiments of the invention. These are presented only by way of example and are not intended to limit the scope of the invention in any way.

Embodiment 1. A method, comprising: receiving a set of requirements for aspects of a network; identifying a gap between one of the aspects of the network and a zero trust (ZT) requirement; determining a solution set comprising potential solutions for reducing or eliminating the gap; associating a respective cost with each of the solutions; determining an extent to which the solutions of the solution set comply with requirements; recommending a best solution from the solutions of the solution set; determining a priority of the gap relative to respective priorities of other gaps; and outputting a list of the gaps, sorted by priority, and the recommended best solution.

Embodiment 2. The method as recited in any preceding embodiment, further comprising implementing the best solution by modifying the network so that the network is in compliance with the ZT requirement.

Embodiment 3. The method as recited in any preceding embodiment, wherein the gap is associated with a cost to implement the best solution, and with a cybersecurity criticality score.

Embodiment 4. The method as recited in any preceding embodiment, wherein the requirements for the network comprise a latency requirement, and a security requirement.

Embodiment 5. The method as recited in any preceding embodiment, wherein the ZT requirement comprises a network security requirement.

Embodiment 6. The method as recited in any preceding embodiment, wherein the best solution is automatically identified based on analysis of the gaps and their respective criticality scores.

Embodiment 7. The method as recited in any preceding embodiment, wherein the gap concerns a specific hardware component or software component of the network.

Embodiment 8. The method as recited in any preceding embodiment, wherein the best solution is recommended based in part on modifications that have been made to another network or solution.

Embodiment 9. The method as recited in any preceding embodiment, wherein the requirements include a cost constraint pertaining to one of the gaps.

Embodiment 10. The method as recited in any preceding embodiment, wherein the solution set is automatically updated when a change occurs to the network that implicates the ZT requirement.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
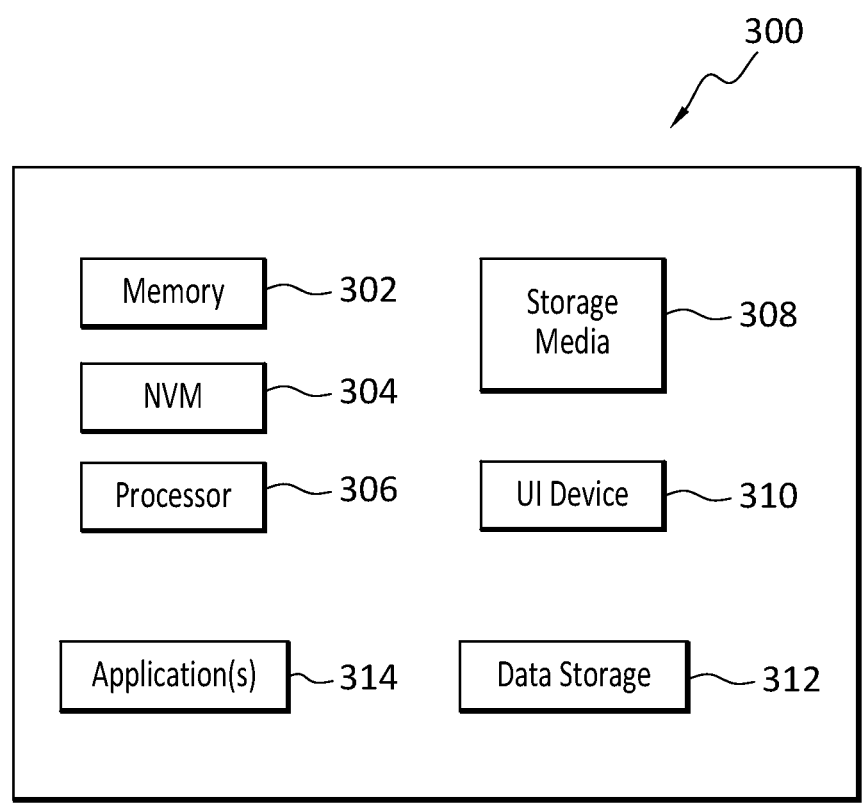
FIG. 3 discloses an example computing entity configured and operable to perform any of the disclosed methods, processes, and operations.

With reference briefly now to FIG. 3, any one or more of the entities disclosed, or implied, by FIGS. 1-2, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving a set of requirements and solution templates for aspects of a network;
   identifying, by a computer processor, a gap between one of the aspects of the network and a zero trust (ZT) requirement with a parser that parses the set of requirements;
   determining a solution set comprising potential solutions for reducing or eliminating the gap;
   associating, by the computer processor, a respective cost with each of the solutions;
   determining, by the computer processor, an extent to which the solutions of the solution set comply with requirements;
   recommending, using automated recommendation tools, a best solution from the solutions of the solution set, wherein the best solution is recommended based in part on modifications that have been made to another solution;
   determining a priority of the gap relative to respective priorities of other gaps; and
   outputting, by the computer processor a list of the gap and the other gaps, sorted by priority, and the recommended best solution for the gap and the other gaps.

2. The method as recited in claim 1, further comprising implementing the best solution by modifying the network so that the network is in compliance with the ZT requirement.

3. The method as recited in claim 1, wherein the gap is associated with a cost to implement the best solution, and with a cybersecurity criticality score.

4. The method as recited in claim 1, wherein the set of the requirements for the aspects of the network comprises a user experience requirement, and a security requirement latency requirement, and the user experience requirement comprises latency.

5. The method as recited in claim 1, wherein the ZT requirement comprises a network security requirement.

6. The method as recited in claim 1, wherein the best solution is automatically identified based on analysis of the other gaps in the list and their respective criticality scores.

7. The method as recited in claim 1, wherein the gap concerns a specific hardware component or software component of the network.

8. The method as recited in claim 1, wherein the set of the requirements for the aspects of the network includes a cost constraint pertaining to one of the other gaps in the list.

9. The method as recited in claim 1, wherein the solution set is automatically updated when a change occurs to the network that implicates the ZT requirement.

10. A non-transitory storage medium having stored therein instructions that are executable by one or more hardware processors to perform operations comprising:
    receiving a set of requirements and solution templates for aspects of a network;
    identifying, by a computer processor, a gap between one of the aspects of the network and a zero trust (ZT) requirement with a parser that parses the set of requirements;
    determining a solution set comprising potential solutions for reducing or eliminating the gap;
    associating, by the computer processor, a respective cost with each of the solutions;
    determining, by the computer processor, an extent to which the solutions of the solution set comply with requirements;
    recommending, using automated recommendation tools, a best solution from the solutions of the solution set, wherein the best solution is recommended based in part on modifications that have been made to another solution;
    determining a priority of the gap relative to respective priorities of other gaps; and
    outputting, by the computer processor a list of the gap and the other gaps, sorted by priority, and the recommended best solution for the gap and the other gaps.

11. The non-transitory storage medium as recited in claim 10, further comprising implementing the best solution by modifying the network so that the network is in compliance with the ZT requirement.

12. The non-transitory storage medium as recited in claim 10, wherein the gap is associated with a cost to implement the best solution, and with a cybersecurity criticality score.

13. The non-transitory storage medium as recited in claim 10, wherein the set of the requirements for the aspects of the network comprises a user experience requirement, and a security requirement latency requirement, and the user experience requirement comprises latency.

14. The non-transitory storage medium as recited in claim 10, wherein the ZT requirement comprises a network security requirement.

15. The non-transitory storage medium as recited in claim 10, wherein the best solution is automatically identified based on analysis of the other gaps in the list and their respective criticality scores.

16. The non-transitory storage medium as recited in claim 10, wherein the gap concerns a specific hardware component or software component of the network.

17. The non-transitory storage medium as recited in claim 10, wherein the set of the requirements for the aspects of the network includes a cost constraint pertaining to one of the other gaps in the list.

18. The non-transitory storage medium as recited in claim 10, wherein the solution set is automatically updated when a change occurs to the network that implicates the ZT requirement.

* * * * *